United States Patent [19]
Aoki

[11] 3,830,613
[45] Aug. 20, 1974

[54] INJECTION MOLDING APPARATUS WITH HORIZONTALLY RECIPROCAL MOLDS AND VERTICALLY ACTING CLAMPING MEANS

[76] Inventor: Katashi Aoki, 6037 Oaza Minamijo, Sakaki-machi, Japan

[22] Filed: May 23, 1973

[21] Appl. No.: 363,296

Related U.S. Application Data

[62] Division of Ser. No. 94,662, Dec. 3, 1970, abandoned.

[30] Foreign Application Priority Data
Dec. 9, 1969 Japan.............................. 44-98519
Mar. 25, 1970 Japan.............................. 45-24628

[52] U.S. Cl.............. 425/246, 425/450 R, 425/451, 425/DIG. 221
[51] Int. Cl............................................. B29c 1/16
[58] Field of Search............ 425/451, 450 R, 450 C, 425/DIG. 221, 246, 183, 190, DIG. 223

[56] References Cited
UNITED STATES PATENTS
3,242,532   3/1966   Borah ........................... 425/183 X
3,307,223   3/1967   Jacobs ............................... 425/246
3,521,327   7/1970   Fink et al........................ 425/129 X
3,523,993   8/1970   Hawkins ........................ 425/246 X

*Primary Examiner*—J. Spencer Overholser
*Assistant Examiner*—David B. Smith

[57] ABSTRACT

The apparatus generally comprising a mold clamping device including a mold clamping ram vertically operable toward a mold receiving chamber, an injection nozzle directed into the mold receiving chamber, and one or more metal molds each provided with a mold opening-and-closing device and mounted on a horizontally reciprocable plate entering into and retracting out of the mold receiving chamber, and the process is so organized that when one of the metal mold is transported, in its closed state, into the mold receiving chamber under a horizontal movement of the reciprocable plate, the mold clamping ram is operated for clamping the metal mold and a plastic material is injected into the mold cavity of the metal mold through the injection nozzle, and when the reciprocable plate moves out to another position, the metal mold thus injected is opened by means of the mold opening-and-closing device and the molded product is delivered.

4 Claims, 23 Drawing Figures

INJECTION MOLDING APPARATUS WITH HORIZONTALLY RECIPROCAL MOLDS AND VERTICALLY ACTING CLAMPING MEANS

This is a division of application Ser. No. 94,662, filed Dec. 3, 1970, now abandoned.

BACKGROUND OF THE INVENTION

This invention relates to an injection molding process and the apparatus for practicing the process whereby the injection molding of comparatively large synthetic resin molding products requiring a high injection pressure can be obtained with the use of a comparatively small sized apparatus.

Generally speaking, the injection pressure is elevated in proportion to the size of the molded products. And the metal molds and the mold clamping devices must be rugged and of large sizes sufficient to withstand the injection pressure. However, most of the conventional apparatuses have had a construction including the mold clamping device and the injection device arranged in horizontal directions, and as a result, the size of the injection molding apparatus is much enlarged and the floor space occupied by the injection molding apparatus is increased.

Furthermore, because the size of the injection molding apparatus becomes large, the transportation and the assembling of the apparatus require much time and labor and the production of such an apparatus needs a highly accurate technique, whereby the production cost per one apparatus will be much elevated.

SUMMARY OF THE INVENTION

Therefore, a primary object of the present invention is to provide an injection molding apparatus wherein the mold clamping device and the injection device are arranged in the vertical direction, and the size and floor space of the apparatus are much reduced.

Another object of the present invention is to provide an injection molding apparatus wherein the injection position for the metal mold can be varied in accordance with the shape of the products despite of the position of the injecting device is set to a predetermined location.

Still another object of the present invention is to provide an injection molding apparatus wherein the injection position to the metal mold can be freely changed by means of an ordinary fixing procedure without requiring special operations and fitting works.

Still another object of the invention is to provide an injection molding apparatus wherein the melted plastic material injected from the injecting device of the apparatus can be further injected into the mold cavity through another replaceable nozzle tightly contacting the metal mold maintaining the temperature of the plastic material to a value injected from the first injecting device.

A further object of the invention is to provide an injection molding apparatus wherein each of the metal molds is provided with a nozzle device, the injecting position of which against the metal mold can be freely changed regardless of the injecting device of the apparatus is preset to a determined position.

An additional object of the present invention is to provide an injection molding apparatus, wherein the nozzle device can be replaced without requiring any special skill or procedure, and the melted plastic material injected from the first injection device can be reinjected through the replaceable nozzle without being cooled.

A further additional object of the invention is to provide an injection molding apparatus, wherein the metal molds are reciprocally moved in a transversal direction against the mold clamping direction of the mold clamping device, and despite of the fact that a mold opening-and-closing plate connected with one mold-half is interposed between a pressure receiving plate from which the injection nozzle is projected and the metal mold, there is no necessity of retracting the injection nozzle while the metal mold is shifted transversally.

A still additional object of the invention is to provide an injection molding apparatus, wherein an intensified clamping of the metal mold can be realized through a comparatively small movement of the mold clamping ram, and the slight moving distance is selected to a minimum value which is sufficient to assure the tight contact of the injection nozzle to the touching position on the metal mold.

The above described and other objects of the present invention can be achieved by the provision of a novel injection molding process and the apparatuses which are mainly constituted in such a manner that against a mold clamping device including an injection nozzle projected toward a mold clamping ram vertically movable through a structural portion of the apparatus and also toward a mold receiving chamber located in a position acted by the mold clamping ram, there are provided one or more metal molds each having a mold opening-and-closing device and mounted on a horizontally reciprocable plate movable in and out of the mold receiving chamber, and the mold clamping ram is vertically operated on a metal mold in a closed state brought into the mold receiving chamber together with the mold opening-and-closing device on said reciprocably movable plate so that the metal mold is tightly clamped under the action of the mold clamping ram, and after an injection of a plastic material is completed, the metal mold and the mold opening-and-closing device attached thereto are brought back to their original positions by means of said movable plate with the metal mold subsequently opened under the action of the mold opening-and-closing device.

The nature, principle, and utility of the invention will be be better understood from the following detailed description of the invention with respect to various embodiments thereof when read in conjunction with the accompanying drawings, wherein like parts are designated by like reference numerals and symbols.

BRIEF DESCRIPTION OF DRAWINGS

In the drawings:

Figures 1, 2:
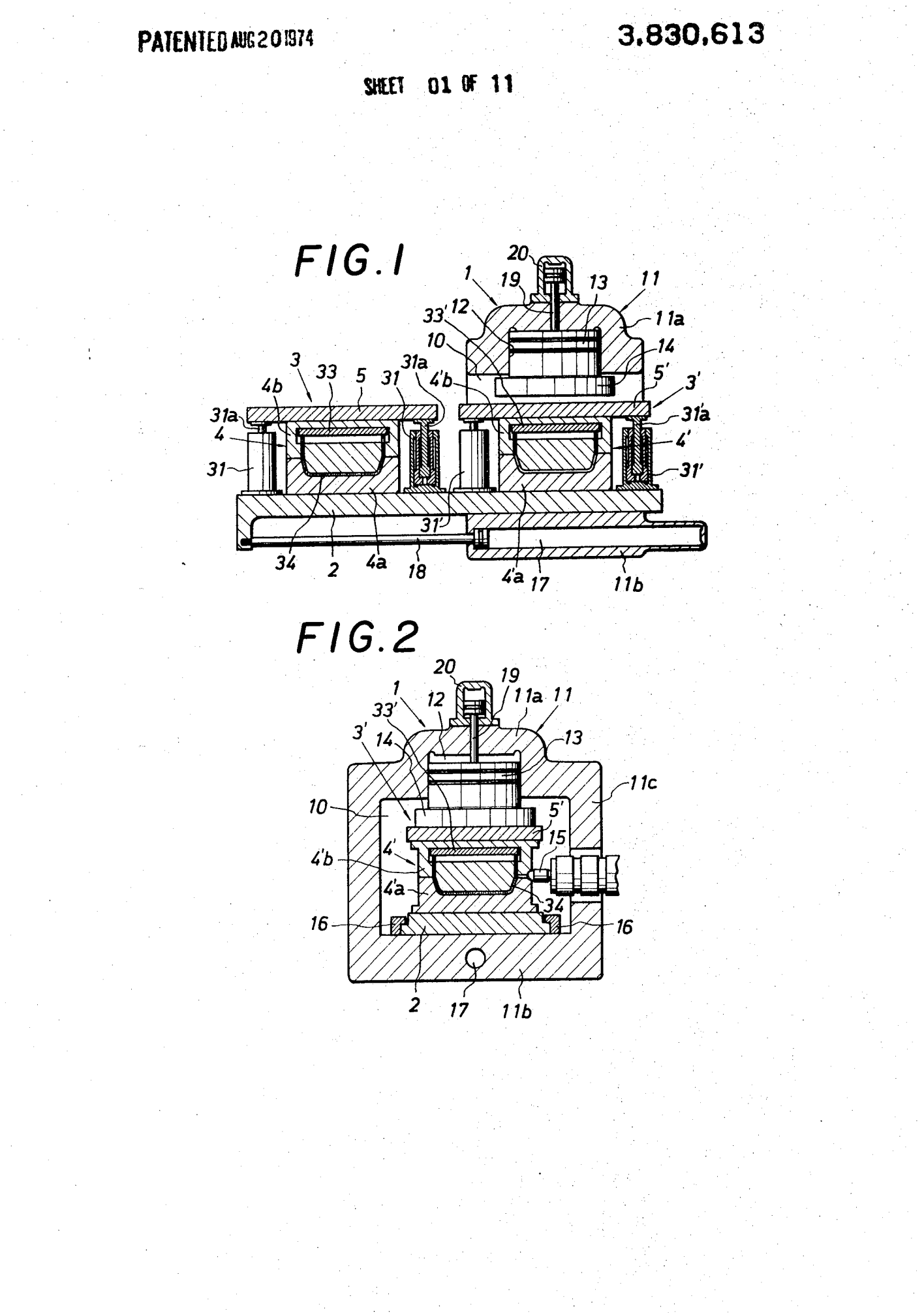

FIG. 1 is a longitudinal sectional view of an injection molding apparatus which constitutes a first embodiment of the present invention;

FIG. 2 is a transversal sectional view of the same injection molding apparatus taken along the line II — II in FIG. 3;

DETAILED DESCRIPTION

Figure 3:
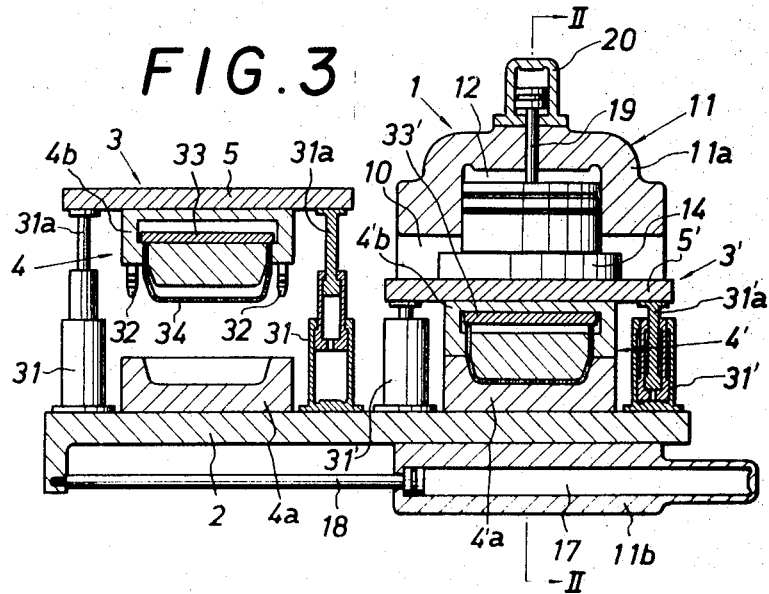
FIGS. 3 through 5 are longitudinal sectional views of the same injection molding apparatus for showing the injection molding processes according to the invention sequentially.
Figure 7:
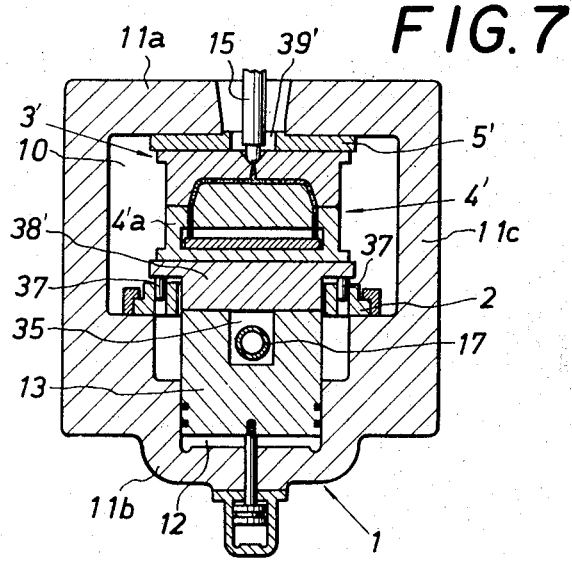
FIG. 7 is a transversal sectional view of the second embodiment of the invention taken along III — III line in FIG. 8.
Figure 4:
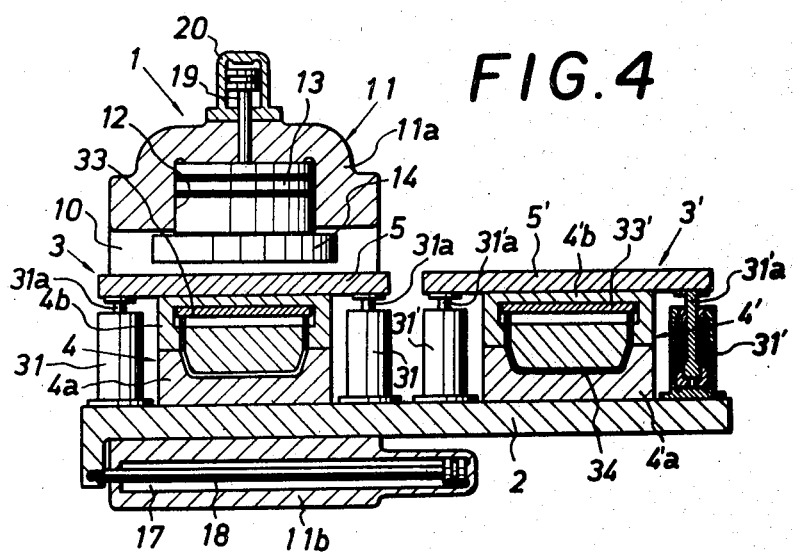
Figure 5:
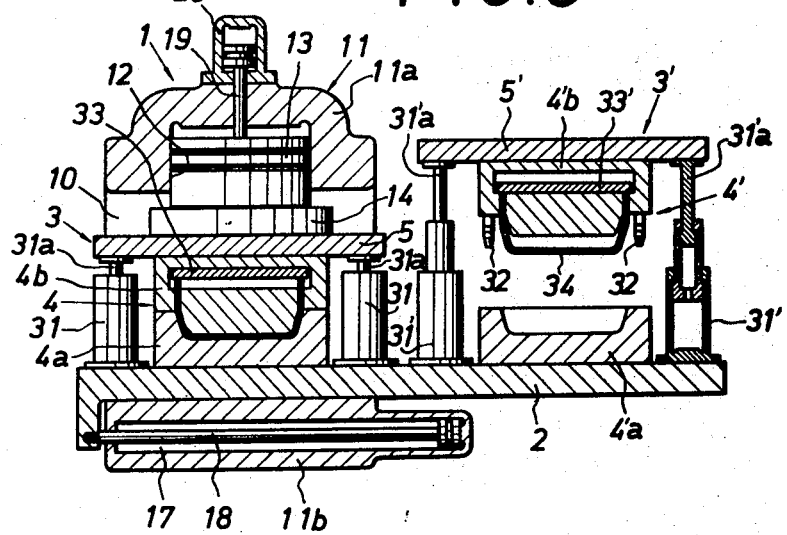
Figure 6:
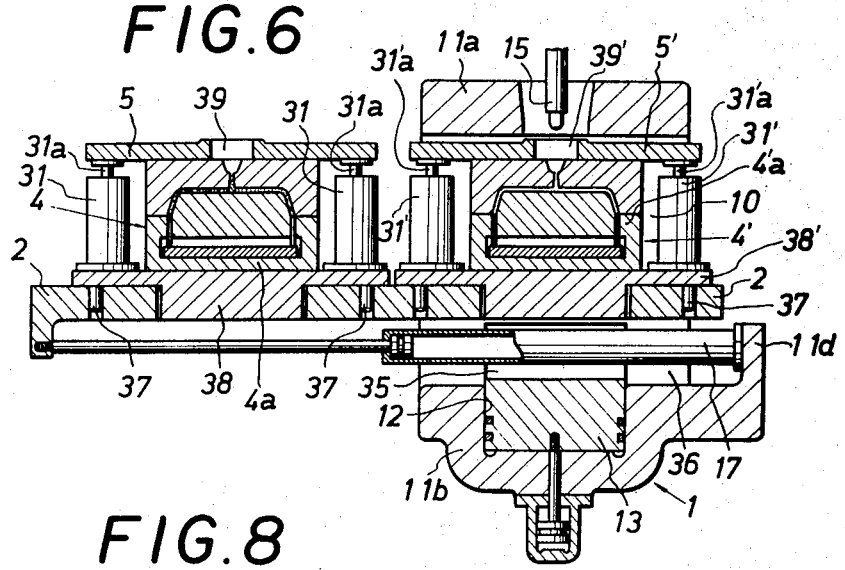
FIG. 6 is a longitudinal sectional view of another injection molding apparatus which constitutes a second embodiment of the present invention.
Figure 8:
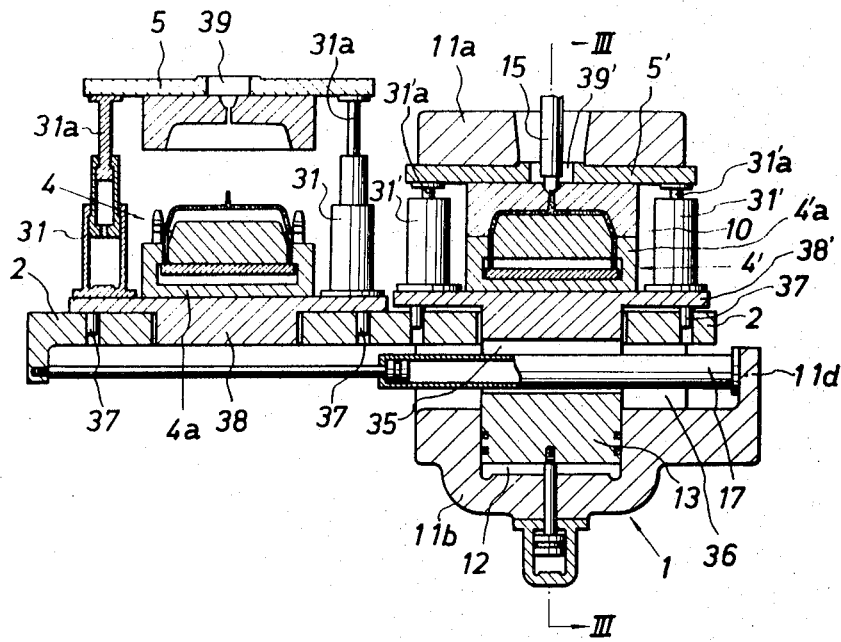
FIGS. 8 through 10 are longitudinal sectional views of the second embodiment of the invention for indicating the injection molding processes sequentially.
Figure 9:
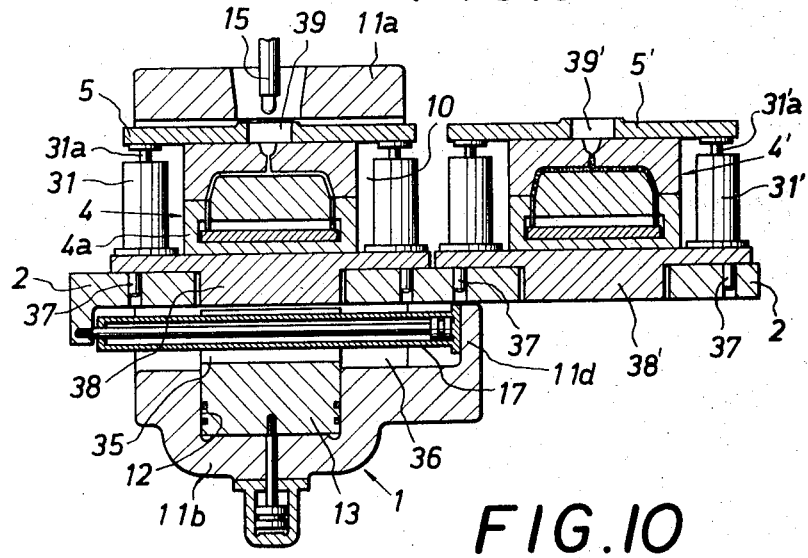
Figure 10:
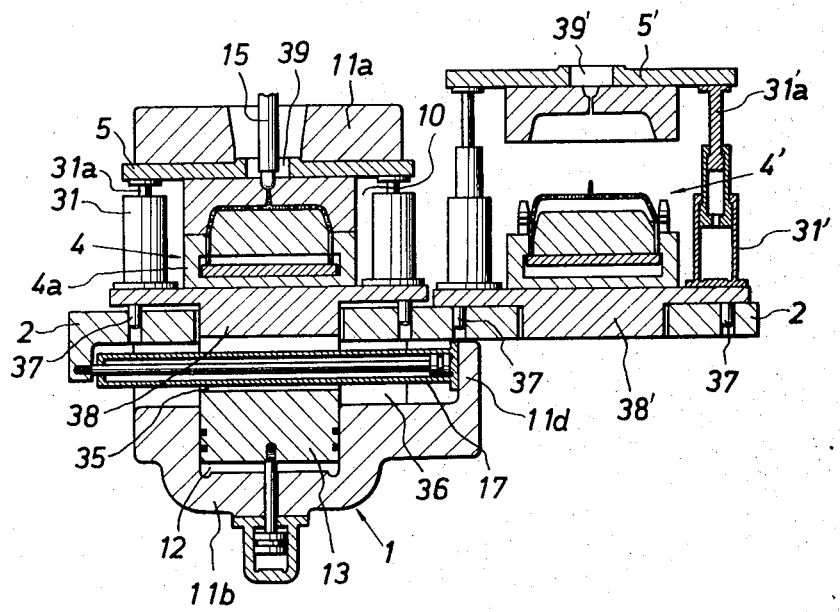

In the drawings, there are indicated a mold clamping device 1, a rectangular movable plate 2 extended in a horizontal plane, mold opening-and-closing devices 3, 3' provided on the movable plate 2, and a pair of separable molds 4, 4' mounted on the movable plate 2, of which the lower mold-halves 4a, 4'a are attached to the movable plate 2 and upper mold-halves 4b, 4'b are attached to mold opening-and-closing plates 5, 5', respectively.

The mold clamping device 1 of the first example of the injection molding apparatus according to the present invention comprises, as clearly shown in FIGS. 1 and 2, a main body 11 constituting a structural frame and having a tunnel-shaped mold receiving chamber 10. In a mold clamping cylinder 12 provided in the upper portion 11a of the structural main body 11, a mold clamping ram 13, on the lower end of which is attached a mold clamping plate 14, is inserted in such a manner that the mold clamping ram 13 can be freely moved within the cylinder 12 in the vertical direction. Through one of the side wall 11c located between the upper portion 11a of the main body 11 and a bottom frame of the same, there is provided an injection nozzle 15 directing to the parting line of the separable mold 4.

The movable plate 2 mounting the mold opening-and-closing devices 3, 3' and the separable molds 4, 4' is guided on a pair of guide rails 16, 16 provided on the bottom frame 11b to be moved horizontally to the right and left side of the apparatus, and is connected to a piston included in a cylinder 17 provided through the bottom frame 11b through a connecting rod 18.

The above described mold opening-and-closing devices 3, 3' comprises respectively four cylinders 31, 31' mounted on the movable plate 2 and the above mentioned mold opening-and-closing plates 5, 5' four corners of which are attached to pistons 31a, 31'a included inside of the cylinders 31, 31'. Under the operation of the mold opening-and-closing device 3 or 3', corresponding one of the separable molds 4, 4' is open-or-closed in the vertical direction. The height of the upper mold at the opened state is determined to be lower than the height of the mold receiving chamber 10 in which the metal molds 4, 4' are to be received. Beside of these members, at the upper portion of the mold clamping ram 13, there is provided an auxiliary rod 19 which is operated by an auxiliary cylinder 20 provided at the top of the main body 11a. Furthermore, pins 32, 32' provided on the separating surfaces of the metal molds 4, 4' are guiding pins for registering the molds, and plates 33, 33' are employed for knocking out the article thus produced.

Referring to FIGS. 6 through 10 illustrating the second embodiment of the present invention, the mold clamping device 1 of this embodiment comprises an upper portion 11a of the main body which is limiting the upper portion of the mold receiving chamber 10 and is also serving as a pressure receiving member through which a downwardly directed injection nozzle 15 is provided, and a lower portion 11b of the main body through which is provided a cylinder 12 including a mold clamping ram 13 movable therein in the vertical direction. The lower portion 11b of the main body 11 and the mold clamping ram 13 are provided respectively traversing grooves 35 and 36 at their upper portions for the purpose of providing a hydraulic cylinder 17 for driving the movable plate 2 in the horizontal direction. One end of the hydraulic cylinder 17 is fixed to an arm 11d extended on one side of the lower portion 11b of the main body. With the above described arrangement of the grooves 35, 36 and the hydraulic cylinder 17, the mold clamping ram 13 can be moved without being affected by the existence of the hydraulic cylinder 17.

In the second embodiment, since the separable metal molds 4 and 4' receive strong clamping force from the lower side, these molds are not directly mounted to the movable plate 2, but are mounted on movable seating plates 38 and 38' respectively which are fixed to guiding pins 37, 37 slidably inserted into corresponding holes bored at both sides of the movable plate 2. Furthermore, at the four corners of the movable seating plates 38 and 38', mold opening-and-closing cylinders 31, 31, ..., and 31', 31', ... are uprisingly mounted, and upper ends of the pistons 31a, 31a,... and 31'a, 31'a, ... are respectively attached to mold opening-and-closing plates 5 and 5' through which holes 39, 39' for inserting injection nozzles are bored.

The method of the injection mold according to the present invention will now be described with respect to the first example of the injection molding apparatus. FIG. 1 shows a state of operation at the time when an injection step is completed and the movable plate 2 is horizontally shifted to leftward to send out the separable metal mold 4 together with the mold opening-and-closing plate 3 from the mold receiving chamber 10. At this state, the separable mold 4' on the right side is received into the chamber 10. The cylinders 31, 31, ... are now operated simultaneously by hydraulic pressure to elevate the mold opening-and-closing plate 5, whereby the separable mold 4 is opened in the vertical direction and the article 34 thus produced is taken out of the metal mold 4.

On the other hand, in the mold clamping device 1, the mold clamping ram 13 is lowered by the hydraulic pressure to clamp the metal mold 4' extensively, and melted plastic material is injected through the injection nozzle 15 inserted along the parting line of the metal mold 4' for molding the material into the desired shape.

After the completion of the removal of the article from the metal mold 4, the cylinders 31, 31, ... are operated in the closing direction, whereby the mold opening-and-closing plate 5 is descended and the separated mold 4 is now closed.

Thus when the mold 4 is closed and the injection step is completed for the mold 4', the movable plate 2 is shifted under the action of the hydraulic cylinder 17 rightwardly so that the metal mold 4 is now received into the chamber 10 and the metal mold 4' is taken out of the chamber 10. The mold clamping ram 13 is again operated to clamp the separable mold 4 extensively, and opening of the mold 4' and injecting of the mold 4 are simultaneously carried out inside and outside of the mold clamping device 1.

The auxiliary rod 19 and the auxiliary cylinder 20 are employed for elevating the mold clamping ram 13 after the completion of the injection in the first embodiment of the invention, and for descending the same ram 13 in the second embodiment of the invention.

Furthermore, in the first embodiment of the invention, the mold clamping ram 13 is so arranged as to act downwardly through the mold opening-and-closing plate 5, 5', and, in the second embodiment, the same ram 13 is arranged to act upwardly through the movable seating plates 38, 38' mounted on the movable plate 2 so that an extensive compression of the mold is assured in either of the cases.

Figure 11:
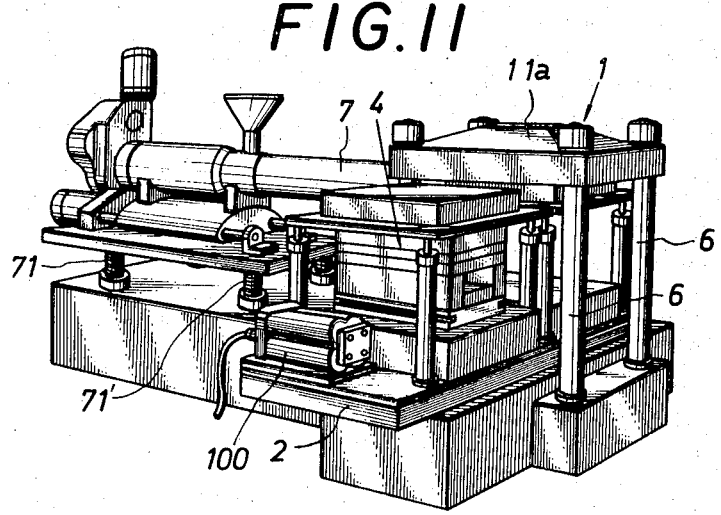
FIGS. 11 and 12 are a perspective view and a longitudinal profile view partly in section, respectively, of the third embodiment of the present invention.
Figure 12:
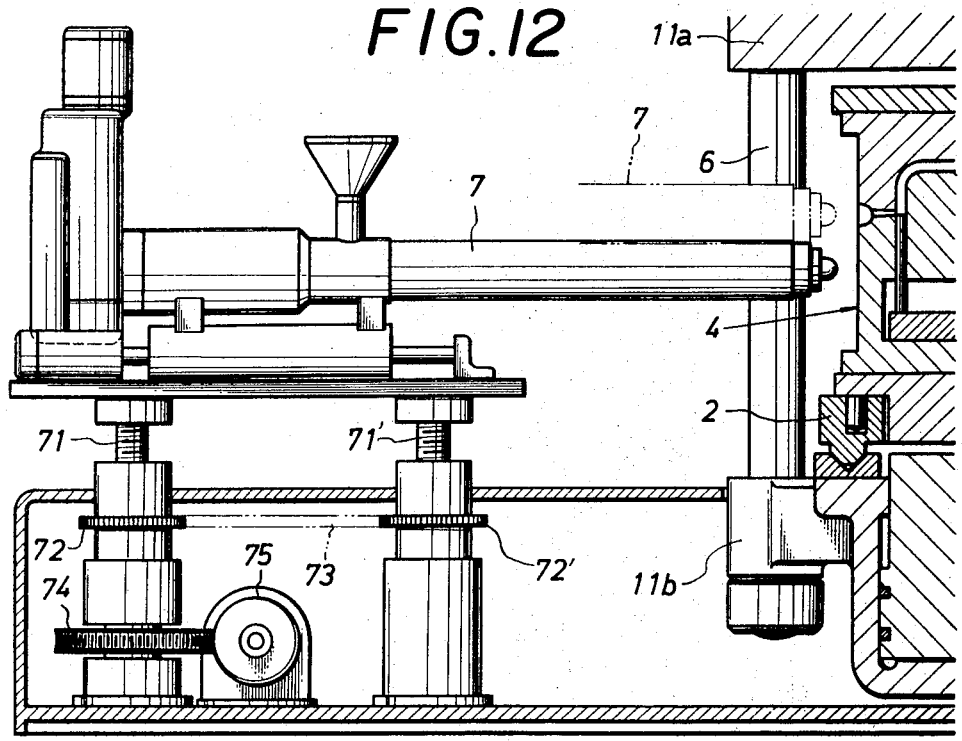

FIGS. 11 and 12 illustrate a third embodiment of the invention, wherein the upper portion 11a of the mold clamping device 1 and the lower portion 11b thereof are coupled together by means of a plurality of tie-rods 6, 6, ..., and hereinafter described oil pressure adjusting devices 100, 100 are provided on both ends of the movable plate 2. Furthermore, there is provided an injection device 7 including a height adjusting device, which is led to the injection nozzle and the height thereof is made adjustable.

The height adjusting device comprises a plurality of supporting shafts 71, 71' for the injection device 7, which are operated synchronizedly. More specifically, a chain 73 is extended around sprocket wheels 72, 72' engaging with the helical threads of the supporting shafts 71, 71', and one of the sprocket wheel 72 is coupled to a driving device 75 through a gear wheel 74. With this construction, the supporting shafts 71, 71' are slowly elevated or descended by means of the synchronizedly rotated sprocket wheels 72, 72' through the chain 73, whereby the injection device 7 is elevated or lowered in accordance with the height of the metal mold.

Figure 13:
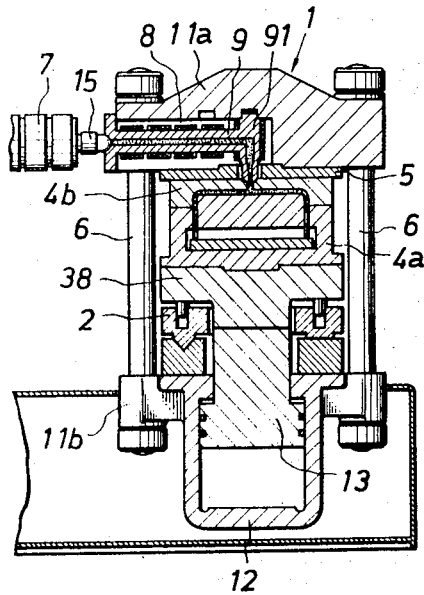
FIG. 13 is a longitudinal sectional view of a mold clamping device constituting one part of the fourth embodiment of the invention.
Figure 14:
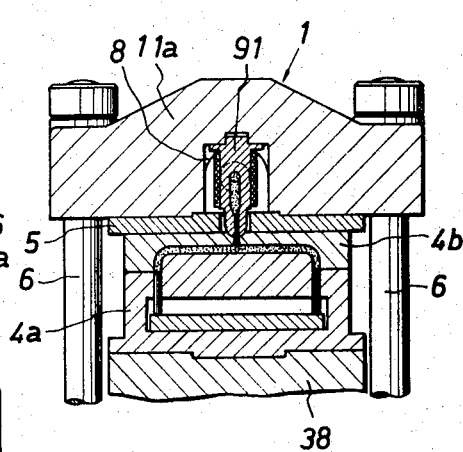
FIG. 14 is a longitudinal sectional view of a principal part of the mold clamping device shown in FIG. 13.
Figure 15:
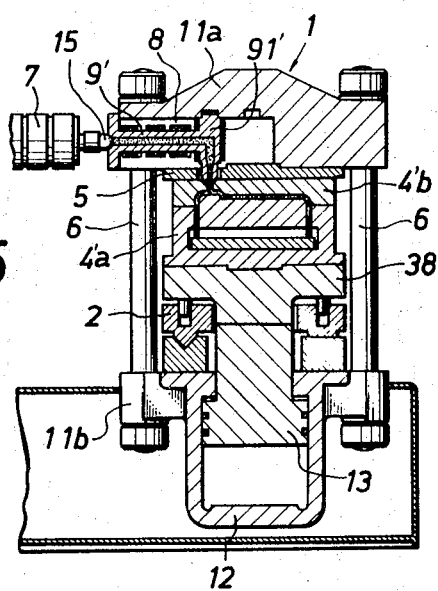
FIG. 15 is a longitudinal sectional view of the same device when the nozzle is replaced.

In FIGS. 13 through 15, there is illustrated an injection molding apparatus constituting the fourth embodiment of the invention. The upper portion 11a of a mold clamping device is provided with a groove 8 in which is included a replaceable injection nozzle having a hot runner 9, and the injection nozzle 91 of the injection molding apparatus is closely connected to an end of the hot runner 9. The mold clamping device 1 further comprises an upper portion 11a and a lower portion 11b coupled through a plurality of tierods 6, 6, and a movable plate 2 disposed between the upper portion 11a and the lower portion 11b. The movable plate 2 is further provided with a vertically movable seating plate 38 which is compressed by a mold clamping ram 13 included in a cylinder 12 provided at the central portion of the lower member 11b of the mold clamping device 1. The lower mold-half 4a fixed to the movable seating plate 38 and the upper mold-half 4b fixed to the upper portion 11a of the clamping device main body 11 are open-or-closed through the movement of the mold opening-and-closing plate 5. After the metal mold is closed, it is clamped under the action of the mold clamping ram 13, and melted plastic material is injected into the inside cavity of the mold through the nozzle 15, hot runner 9, and the injection nozzle 91 provided at the upper central portion of the metal mold.

FIG. 15 illustrate another application of this type of injection molding apparatus to a metal mold consisting of an upper mold-half 4'a and a lower mold-half 4'b and having the position of the plastic material incoming gate nearer to the side where the nozzle 15 of the injection device 7 locates. In this application, the hot runner 9 and the injection nozzle 91 employed in the previous case are replaced by a hot runner 9' of shorter length and an injection nozzle 91', so that the position of the injecting nozzle 91' is displaced from the center of the metal mold to the new location of the gate of the mold. Thus, it is apparent that the location of the injection device 7 and the nozzle 15 can be maintained to the original position even if the injection nozzle 91' is replaced as described above, and the nozzle 15 can be tightly connected to the hot runner 9' as in the case of FIG. 13.

In view of the above described arrangement of the fourth embodiment of the invention shown in FIGS. 13 through 15, it will be apparent that the embodiment can also be adopted for innovation of the conventional injection molding apparatus.

Figure 16:
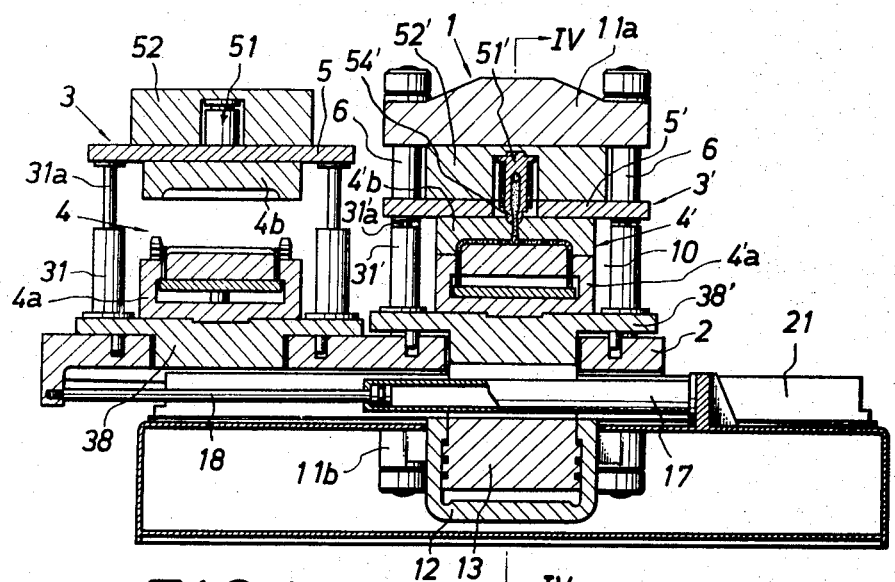
FIG. 16 is a longitudinal sectional view of the fifth embodiment of the invention wherein the molds are in the opened state and under the injected condition.
Figure 17:
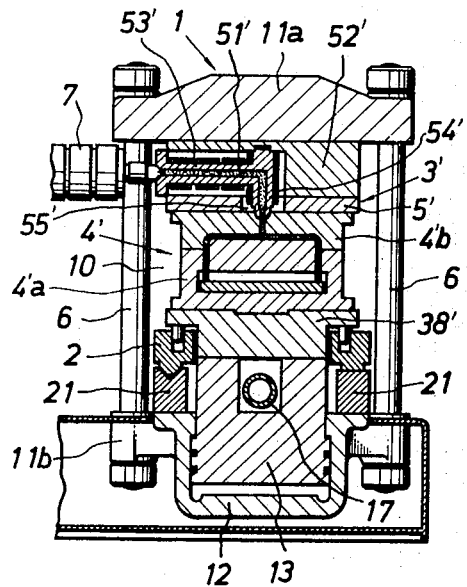
FIG. 17 is a transversal sectional view of the same embodiment along a line IV — IV in FIG. 16.
Figure 18:
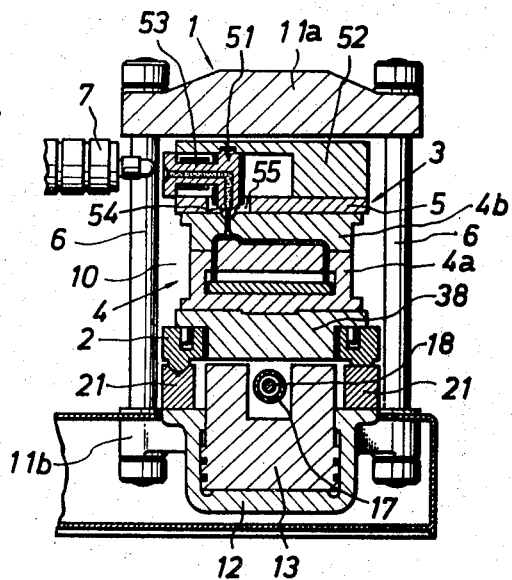
FIG. 18 is a transversal sectional view of the same embodiment wherein another metal mold is brought into the mold clamping device.
Figure 19:
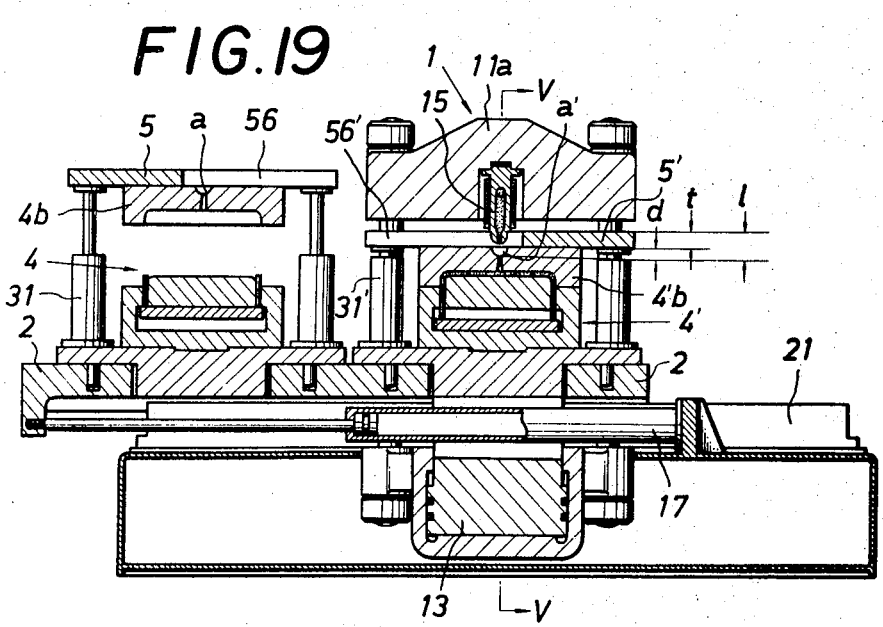
FIG. 19 is a longitudinal sectional view of the sixth embodiment of the invention.
Figure 20:
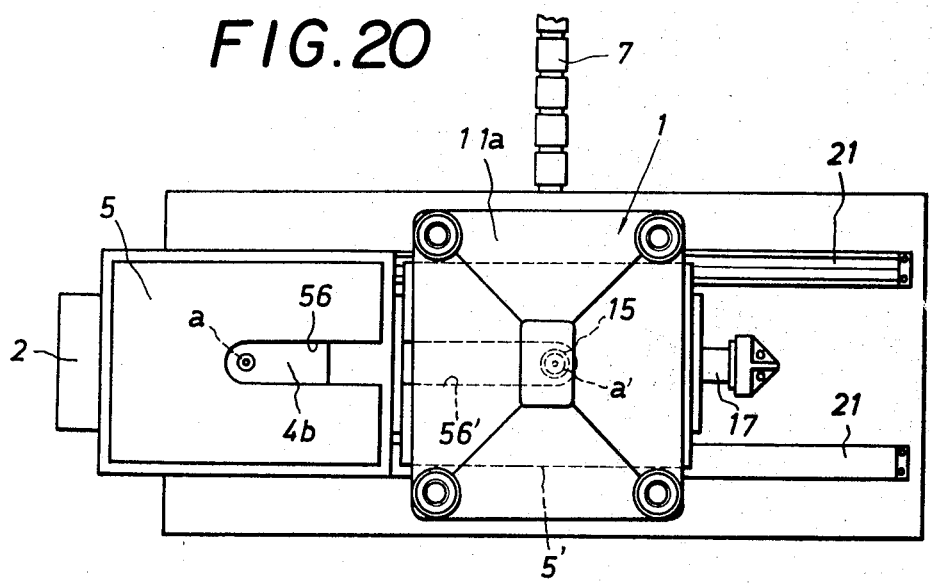
FIG. 20 is a plan view of the same embodiment of the invention.
Figure 21:
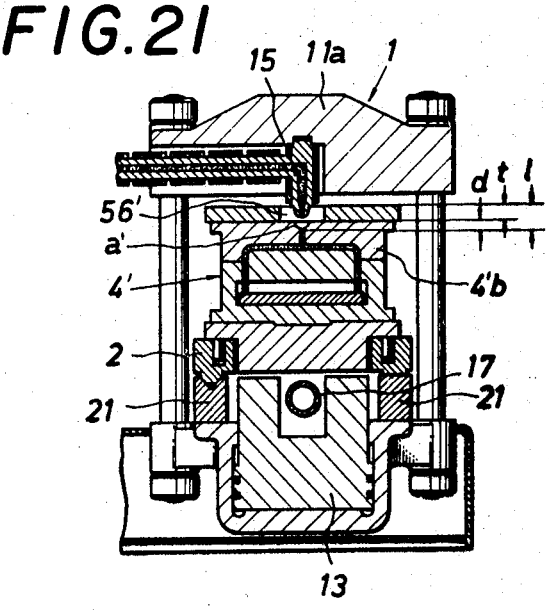
FIG. 21 is a transversal sectional view of the same embodiment along a line V — V in FIG. 19.
Figure 22:
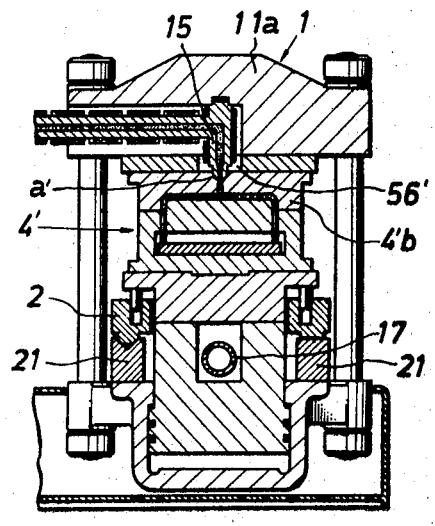
FIG. 22 is a transversal sectional view of the same embodiment when the metal mold is clamped.

Referring now to FIGS. 16 through 18, there is illustrated a fifth embodiment of the invention, wherein the mold clamping device 1 of a vertical type is constructed from an upper portion 11a and a lower portion 11b of the mold clamping main body 11 which are connected together into a rigid body through a plurality of tie-rods 6, 6, so that a mold receiving chamber is formed between the upper portion 11a and the lower portion 11b. At an upper rear position of the mold receiving chamber 10, an injection device 7 is disposed horizontally, and at the central portion of the lower portion 11b of the mold clamping main body, there is provided a mold clamping ram 13 operable in a cylinder 12 vertically in an opposing manner to the upper portion 11a of the same main body.

Furthermore, on the upper surface of the lower portion 11b, there are provided two parallelly disposed guiding rails 21, 21 for supporting a movable plate 2 of the similar construction as disclosed before, and one end of the movable plate 2 and the lower portion 11b on which the rails 21, 21 are mounted horizontally are coupled together through a shifting device for the movable plate comprising a hydraulic cylinder 17 and a piston rod 18.

On both sides of the movable plate 2, movable seating plates 38, 38' are slidably mounted, and on the upper surfaces of the seating plates 38, 38', mold opening-and-closing devices 3, 3' and the metal molds 4, 4' are successively mounted. The mold opening-and-closing devices 3, 3' comprise respectively four cylinders 31, 31, ... and 31', 31', ... and mold opening-and-closing plates 5, 5', four corners of which are fixed to the upper ends of pistons 31a, 31a, ... and 31'a, 31'a, ... included respectively in the cylinders 31, 31, ... and 31', 31', ..., and under the operation of the cylinders, the upper and lower mold-halves 4b, 4b' are open-or-closed in the vertical direction.

On the upper surfaces of the opening-and-closing plates 5, 5', base plates 52, 52' of a predetermined thickness are provided, and in the base plates 52, 52', replacable nozzles devices 51, 51' are included respectively. The nozzle devices 51, 51' are connected to hot runners 53, 53' of different lengths in integral manner, and nozzles 54, 54' of the nozzle devices 51, 51' are located on different positions of the metal mold and are connected to the upper molds 4b and 4'b through holes 55, 55' provided through the opening-and-closing plates 5, 5'. Other ends of the nozzle devices 51, 51' are tightly connected to the previously described injection device 7 included in the mold receiving chamber 10 when either one of the metal molds is brought into the mold receiving chamber 10 and the mold is tightly closed.

With the above described construction of the injection molding apparatus constituting the fifth embodiment of the invention, the metal molds 4, 4' located at the right-hand side and the left-hand side of the apparatus can be alternatively sent into the mold receiving chamber 10 under the reciprocating movement of the movable plate 2, and the metal mold 4 sent into the mold receiving chamber 10, as shown in FIG. 16, is thereafter subjected to a vertical clamping action of the ram 13 of the mold clamping device 1 and is clamped to the upper portion 11a of the main body 11 of the apparatus together with the opening-and-closing plate 5 and the movable seating plate 38. The injection device 7 is advanced simultaneous with the above described operation, and is tightly contacted with the hot runner 53. On the other hand, the metal mold 4' is opened under the action of the mold opening-and-closing device 3', and the product thus molded is taken out.

As a result, molded products having different injecting positions can be produced in the same injection molding apparatus. Likewise, when a pair of different metal molds are prepared, injection molding of different shapes can be performed alternately employing nozzle devices adapted to the respective metal molds.

FIGS. 19 through 22 illustrate injection molding apparatus constituting sixth embodiment of the invention.

This embodiment is characterized in that grooves 56, 56' cut out in one direction are provided through the mold opening-and-closing plates 5, 5' so that the front end of the injection nozzle 15 may be laterally inserted through the cut out direction. More specifically, the cut-out grooves 56, 56' are directed from nozzle-touching portions a, a' provided on the upper mold-halves 4b, 4'b to the position where the mold clamping device 1 is located, whereby the front end of the injection nozzle 15 projected from the upper portion 11a of the injection device main body 11 is received in the cut-out grooves 56, 56' and tightly contacts with either one of the touching portions a, a' on the upper mold-halves.

In this embodiment of the invention, since the cutout grooves 56, 56' are provided in the mold opening-and-closing plates 5, 5' of the metal molds 4, 4', respectively, the front tip of the injection nozzle 15 projecting from the upper portion 11a of the main body is received in the cutout groove 56 or 56' even if the metal mold 4 or 4' in the closed condition is sent inside of the mold clamping device 1 together with the mold opening-and-closing plate 5 or 5' by means of the movable plate 2, whereby no difficulty is caused by the mold opening-and-closing plate 5 or 5' in sending the metal mold inside of the mold clamping device 1.

Furthermore, since the tip of the injection nozzle 15 is located near the upper mold-half 4b or 4'b, the clamping distance required for elevating the metal mold 4 or 4' is limited to that required for touching of the injection nozzle 15 to the upper mold-half 4b or 4'b. To be more specifically, the vertically elevated distance of the metal mold of for instance 4' when it is clamped will be at least 70 mm, if it is assumed that the mold opening-and-closing plate 5' of 70 mm thickness has no cutout groove 56' except a mere hole for inserting the tip of the injection nozzle 15, and also that the depth (d) of the recessed touching portion a' of the upper mold-half 4'b is 10 mm. Since the elevation of the metal mold is performed under the action of the mold clamping ram 13, the time required for clamping the metal mold is so far elongated although the clamping distance (l) is merely 70 mm.

However, because the mold opening-and-closing plates 5, 5' are provided with cutout grooves 56, 56', the tip of the injection nozzle 15 is placed near the touching portion a or a' of the upper mold-half 4b or 4'b regardless of the thickness of the mold opening-and-closing plate 5 or 5', whereby the vertical movement required for the metal mold at the time of being clamped can be merely 10 mm of the depth of the recessed touching portion a or a', and the clamping speed of the mold can be substantially increased. That is, the injection molding apparatus of this construction can produce far more products continuously than the conventional apparatuses and the height of the mold receiving chamber can also be reduced. Furthermore, the vertical length of the cylinder 12 including the mold clamping ram 13 can be made shorter, and the time required for attaining the maximum mold clamping hydraulic pressure can also be shortened.

Figure 23:
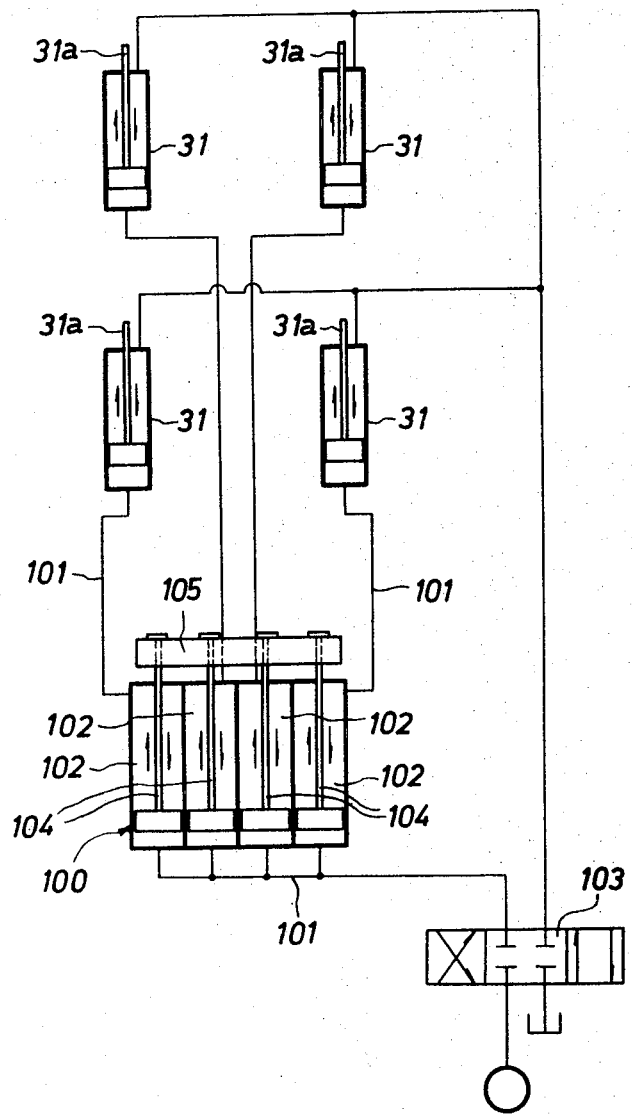
FIG. 23 is a schematic diagram showing a hydraulic system for synchronizing the operations of cylinders for elevating and descending the mold opening-and-closing plate.

In all of the above described embodiments of the invention, for the purpose of elevating or descending the mold opening-and-closing plates 5 and 5' horizontally, each plate requires four cylinders 31, 31, ... or 31', 31', ... operated in synchronism. FIG. 23 schematically indicates the hydraulic system employed for this purpose. In this hydraulic system, a pressurized fluid supplied from a hydraulic pump P is passed through a change-over valve 103 to a plurality of conduits 101, 101, ... connected to four cylinders 102, 102, ... of the oil pressure adjusting device 100 fixed to the end portions of the previously described movable plate 2. All of the piston-rods of the four intermediate cylinders 102, 102, ... are coupled to one synchronizing plate 105, and by this way, the oil pressures in these cylinders 102, 102, ... acting on the piston-rods 104, 104, ... are all equalized. The hydraulic oil thus equalized its pressure is thereafter supplied from each of the cylinders 102, 102, ... to respective mold opening-and-closing cylinders 31, 31, ... or 31', 31', ... for the mold opening-and-closing plates, and either one of the plates 5 and 5' is elevated or descended by the pistons 31a, 31a, ... or 31'a, 31'a, ... Advantageous features of the injection molding apparatuses according to the present invention can be summarized as follows.

a. Since the mold opening-and-closing device and the mold clamping device are constructed to act in the vertical directions, the floor space required for the apparatus can be substantially minimized.

b. Since the metal molds are sequentially clamped by a single mold clamping device, the conventional individually provided mold clamping members are not required and the construction of the injection molding apparatus is much simplified.

c. The mold opening-and-closing plates are supported by a plurality of multi-stage cylinders disposed on the movable plate, whereby the construction of the mold opening-and-closing device can be much simplified.

d. Since the mold opening-and-closing plates are provided with cutout grooves for receiving the injection nozzle, the required stroke of the mold clamping device is minimized, and the total height of the apparatus can be much reduced.

e. Because of the separable metal molds are mounted on a movable plate and are clamped sequentially between a mold clamping members of a mold clamping device, mold mounting procedure can be much simplified and assured.

f. Because no tie-bars are required in this apparatus, there is no hampering members around the separable molds, whereby removal of the products is much simplified.

I claim:
1. An injection molding apparatus comprising
A. a main body;
B. a horizontally open ended tunnel shaped mold receiving chamber in said main body;
C. a cylinder in an upper central portion of said main body;
D. a vertically movable mold clamping ram operably mounted in said cylinder;
E. a lower portion of said main body forming a pressure receiving plate at the bottom of said mold receiving chamber;
F. a movable plate horizontally rectilinearly shiftable in said open ended tunnel shaped chamber;
G. a mold opening and closing mechanism including:

i. a plurality of horizontally spaced cylinders vertically mounted on said movable plate;
   ii. pistons vertically movable in said cylinders; and iii. a mold opening and closing plate attached to the upper ends of said pistons;
H. a vertically separable metal mold having one half thereof attached to said movable plate and the other half thereof attached to said mold opening and closing plate whereby actuation of said pistons in said cylinders vertically separates said mold halves;
I. said metal mold halves being movable with said movable plate into and out of said mold receiving chamber; and
J. an injection nozzle projecting into said mold receiving chamber along the parting line of said separable metal mold.

2. An injection molding apparatus as claimed in claim 1, including two horizontally spaced metal molds and mold opening and closing mechanisms therefor on said movable plate, said two metal molds being alternatively positionable in said mold receiving chamber upon horizontal shifting of said movable plate.

3. An injection molding apparatus as claimed in claim 2, including spaced horizontal guide members opposedly mounted on said main body, said movable plate being engaged between said guide members for guiding said plate in movement thereof for shifting said metal molds into and out of said mold receiving chamber.

4. An injection molding apparatus as claimed in claim 3, wherein said cylinders and pistons for opening and closing said metal molds are positioned at the four corners of said mold opening and closing plates.

* * * * *